(12) United States Patent
Tietze et al.

(10) Patent No.: US 11,256,258 B2
(45) Date of Patent: Feb. 22, 2022

(54) SYSTEM AND METHOD FOR DETERMINING THE POSITION OF A VEHICLE FOR AUTOMATED DRIVING ON A SITE

(71) Applicant: Robert Bosch GmbH, Stuttgart (DE)

(72) Inventors: Nils Tietze, Stuttgart (DE); Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 16/422,126

(22) Filed: May 24, 2019

(65) Prior Publication Data

US 2019/0361448 A1   Nov. 28, 2019

(30) Foreign Application Priority Data

May 26, 2018   (DE) .......................... 102018208327.4

(51) Int. Cl.
    G05D 1/02   (2020.01)
(52) U.S. Cl.
    CPC ......... G05D 1/0212 (2013.01); G05D 1/0236 (2013.01); G05D 1/0242 (2013.01); G05D 1/0244 (2013.01); G05D 1/0257 (2013.01); G05D 2201/0213 (2013.01)
(58) Field of Classification Search
    CPC . G01S 7/40; G01S 13/93; G01S 17/06; G01C 21/28; G01B 11/03; G05D 1/02; G05D 1/0212; G05D 1/214; G05D 1/221; G05D 1/225; G05D 1/236; G05D 1/24; G05D 1/242; G05D 1/244; G05D 1/257; G05D 1/259; G05D 1/276; G05D 1/278; G05D 2201/201; G05D 2201/213; G62D 15/00
    See application file for complete search history.

(56) References Cited

U.S. PATENT DOCUMENTS

| 4,811,228 A | * | 3/1989 | Hyyppa | G01S 5/08 180/169 |
| 6,910,660 B2 | * | 6/2005 | LeCroy, Jr. | B64G 1/646 244/158.1 |
| 10,209,080 B2 | * | 2/2019 | Lindhe | G05D 1/0274 |
| 2016/0026185 A1 | * | 1/2016 | Smith | G05D 1/0259 356/614 |
| 2017/0016838 A1 | * | 1/2017 | Donohue | G01N 27/12 |

FOREIGN PATENT DOCUMENTS

| SE | WO-9921026 | * | 10/1997 | .............. G05D 1/03 |
| SE | WO 9921026 | * | 10/1998 | |

* cited by examiner

*Primary Examiner* — Jess Whittington
*Assistant Examiner* — Terry C Buse
(74) *Attorney, Agent, or Firm* — Norton Rose Fulbright US LLP; Gerard Messina

(57) ABSTRACT

A system is described for determining the position of a vehicle on a site and for calculating a trajectory, including at least one vehicle, at least one auxiliary device and at least one reflector element, the at least one reflector element being mounted in the surroundings of the vehicle along a designated route section and the auxiliary device being suitable for transmitting and receiving electromagnetic beams. A method is also described.

8 Claims, 3 Drawing Sheets

SYSTEM AND METHOD FOR DETERMINING THE POSITION OF A VEHICLE FOR AUTOMATED DRIVING ON A SITE

FIELD OF THE INVENTION

The present invention relates to a system for determining the position of a vehicle on a site and for calculating a trajectory, including at least one vehicle, at least one auxiliary device and at least one reflector element, as well as a method for navigating a vehicle along a trajectory and for determining the position of the vehicle on a site.

BACKGROUND INFORMATION

In many present vehicles, radar systems are installed, in particular for ascertaining distances and for detecting surroundings of a vehicle. With the emission of electromagnetic beams, the so-called primary beams or primary signals, and the reflection of the electromagnetic beams on objects, a reflected portion of the beams or secondary signal is received and evaluated based on various criteria in order to determine pieces of information such as, for example, distance or dimension of the object.

In order to equip a vehicle for automated driving, the technology required for such purpose, made up of a GPS sensor system, a vehicle controller, connectivity as well as a safety system, must be attached to the vehicle and calibrated after the vehicle is produced or at an end of an assembly line. An automated vehicle guidance of the vehicle requires an absolute position of the vehicle. For this purpose, the system normally includes a highly accurate GPS sensor. Since the GPS signal is unable to maintain its accuracy in so-called street canyons, an intelligent camera system is also used for the highly accurate position determination. In the process, the camera system recognizes so-called "markers", the absolute position of which is known, and merges the position data with the GPS data.

The problem with the system described are the inaccuracies of the GPS sensors in some areas, the extensive installation and calibration effort, as well as the costs of such systems.

SUMMARY

An object underlying the present invention may be considered to be that of providing a system and a method that enables an affordable and precise end-of-line automation.

According to one aspect of the present invention, a system is provided for determining the position of a vehicle on a site and for calculating a trajectory. The system includes at least one vehicle, at least one auxiliary device and at least one reflector element, the at least one reflector element being mounted in the surroundings of the vehicle along a designated driving route and the auxiliary device being suitable for transmitting and receiving electromagnetic beams.

The system according to the present invention enables vehicles and, in particular, new vehicles to be equipped for a so-called end-of-line automation. With the ELA, the vehicles may drive in an automated manner and, therefore, without a driver from the end of the production line, the so-called end-of-line, to a loading station such as, for example, a truck or a train.

The system according to the present invention is not limited to the field of application of the ELA. Instead, the site may be an arbitrary infrastructure.

A site may, for example, be a factory site, a parking area, an urban area, an area utilized for agricultural or forestry purposes and the like.

The reflector elements may, for example, be angular reflectors having at least two surfaces or so-called corner reflectors or Lüneburg lenses, which reflect the generated electromagnetic beams back in the direction of the beam source. The electromagnetic beams are generated by the auxiliary device. The beams reflected on objects or on the reflector elements may be received and evaluated by the auxiliary device. For this purpose, the auxiliary device includes preferably at least one transmitting unit and at least one receiving unit. The electromagnetic beams may be radar beams or light beams such as, for example, infrared beams or ultraviolet laser beams. The electromagnetic beams may be used to carry out a precise determination of the position of the vehicle, on which the auxiliary device is positioned.

A plurality of reflector elements may be situated along the trajectory to be driven by the vehicle. The reflector elements may preferably be mounted on the infrastructure or in the site or may be integrated into the infrastructure or site. For example, the reflector elements may be situated on walls, signs, posts or on roadway boundaries. The reflector elements may form control points for the auxiliary device individually or in groups.

The distinct back radiation of the generated electromagnetic beams from the reflector elements may be detected by the receiving unit of the auxiliary device and may be clearly assigned to the reflector elements by a control unit of the auxiliary device. As a result of the characteristic of the secondary beams, the control unit is able, in particular, to calculate a distinct position of the auxiliary device relative to the respective reflector elements in the scanning area of the auxiliary device. Based on the position of the auxiliary device relative to the reflector elements along the driving route of the vehicle, it is possible to ascertain an absolute vehicle position or position of the auxiliary device situated on the vehicle.

By attaching the auxiliary device on, in or to the vehicle, the vehicle may be equipped with an autonomous driving function using technically simple means. The control instructions of the auxiliary device may be transmitted via a standardized hardwired or wireless vehicle interface. In addition, a time-consuming calibration of each vehicle after its final assembly may be omitted.

According to one exemplary embodiment of the system, the auxiliary device includes a control unit for ascertaining angles of incidence of received electromagnetic beams. The angle of incidence of the received beams may be calculated by the control unit as a function of the design of the receiving unit. The receiving unit may, for example, be constructed as an array or may be rotatable or pivotable along a rotation axis. The position and orientation of the transmitting unit and/or of the receiving unit may be ascertained with the aid of an algorithm contained in the control unit and, for example, the angle of incidence may therefore be deduced.

The angle of incidence of the reflected beams is an essential piece of information with respect to a position of the auxiliary device relative to at least one reflector element. As a result, the position of the vehicle relative to the reflector elements may be ascertained.

In addition, a distance of the auxiliary device to at least one reflector element may be estimated based on an intensity of the received reflected beams, so that a relative position may be calculated with a higher degree of accuracy by the control unit.

According to another exemplary embodiment of the system, the auxiliary device includes a control unit for ascertaining at least one reflecting pattern of reflected electromagnetic beams. Since there is no possibility of determining, based on the reflected electromagnetic beams, whether these electromagnetic beams have been reflected from a first or from a second reflector element, a specific pattern may be generated by the reflector elements for determining an absolute position of the vehicle or of the auxiliary device. Each reflector element may preferably reflect the electromagnetic beams in the form of a clearly identifiable reflection pattern in the direction of the auxiliary device.

According to another exemplary embodiment of the system, at least two reflector elements are mounted at one position in the surroundings of the vehicle. A characteristic reflection pattern may be generated, for example, by two reflector elements situated adjacent to one another. As a function of a relative orientation or arrangement of the at least two reflector elements, it is possible for clearly identifiable control points to be created by the control unit from at least two reflector elements, which enable a precise, absolute position determination.

According to another exemplary embodiment of the system, the at least one reflecting pattern and/or the at least one reflecting angle of the electromagnetic beams are identifiable by the control unit as a defined position of the designated driving route. In this way, precisely determinable control points may be created along a driving route of the at least one vehicle. Based on the clear identification, the control unit of the auxiliary device may determine its exact position at any time and reliably steer the vehicle along the desired trajectory.

According to another exemplary embodiment of the system, a distance between the at least two reflector elements is defined as a distinctive feature for each position in the surroundings of the vehicle. The distance between the at least two reflector elements and, therefore, also the distance between the signals clearly detected by the receiving unit may be used as an additional piece of information for clearly ascertaining a control point along the trajectory. The determined distances or distance changes of the reflector elements along the trajectory may be stored in advance in the control unit of the auxiliary device. A comparison of the evaluated measurements of the receiving unit with the stored data may therefore result in an absolute position of the vehicle.

According to another exemplary embodiment of the system, at least one reflector element includes a shield. The shield may result in a degree of freedom insofar as a reflector element for the auxiliary device is "visible" or detectable only in a short route section. This may prevent ambiguities in the evaluation of the reflected beams, as a result of which a less efficient control unit is usable. This may also lower the costs of the auxiliary device.

According to another exemplary embodiment of the system, the shield is designed differently at each position in the surroundings of the vehicle or is attached at a different angle to the at least one reflector element. As a result of this measure, each reflector element may be detected by the auxiliary device only at a predefined angle due to the shield. Thus, an absolute position may be ascertained based on specific reflection angles of the electromagnetic beams.

According to another exemplary embodiment of the system, the auxiliary device is suitable for ascertaining and/or for using odometry data for determining the position of the vehicle on the restricted site. The odometry data may be provided to the auxiliary device preferably by a vehicle sensor system. The odometry data and/or a location estimation of the auxiliary device based on pieces of movement information may be used to ascertain the absolute position of the vehicle. The respective reflector elements or the control points may be preferably situated along the trajectory in such a way that a combination or consideration of the detected reflector elements with the odometry data results in an absolute vehicle position. In addition or alternatively, the reflector elements may be assigned the odometry data for a position determination based on the specific reflecting patterns.

According to another aspect of the present invention, a method is provided for navigating a vehicle along a trajectory and for determining the position of the vehicle on a site. The vehicle in this case includes an auxiliary device mounted on the vehicle. A relative or absolute position of the vehicle is ascertained as a result of the interaction of the auxiliary device with reflector elements, and the vehicle is controlled based on control specifications of the auxiliary device.

The method according to the present invention enables a precise determination of the position of the auxiliary device and, thus, of a vehicle. An affordable and technically simple ELA, in particular, may be implemented by the method, since the absolute position of the vehicle may be determined without an expensive GPS system for the navigation.

By attaching the auxiliary device to a vehicle and by coupling the auxiliary device with the vehicle, an automated driving function may be enabled by the sensor system and by the control unit of the auxiliary device. As a result, a drive of new vehicles at the factory, in particular, may be carried out with the aid of the security system or the auxiliary device subsequently attached to the new vehicle. The sensor system of the auxiliary device may be designed preferably in the form of radar sensors or LIDAR sensors.

However, the method according to the present invention is not limited to the transfer of vehicles within a factory. With the method, arbitrary vehicles may instead be equipped for an automatic operation within an area or within a site. For example, shuttle vehicles for passenger transport or transport vehicles in the factory, at airports, at construction sites, on fairgrounds and the like may be automated by using an auxiliary device and reflector elements.

DETAILED DESCRIPTION

Figure 1:
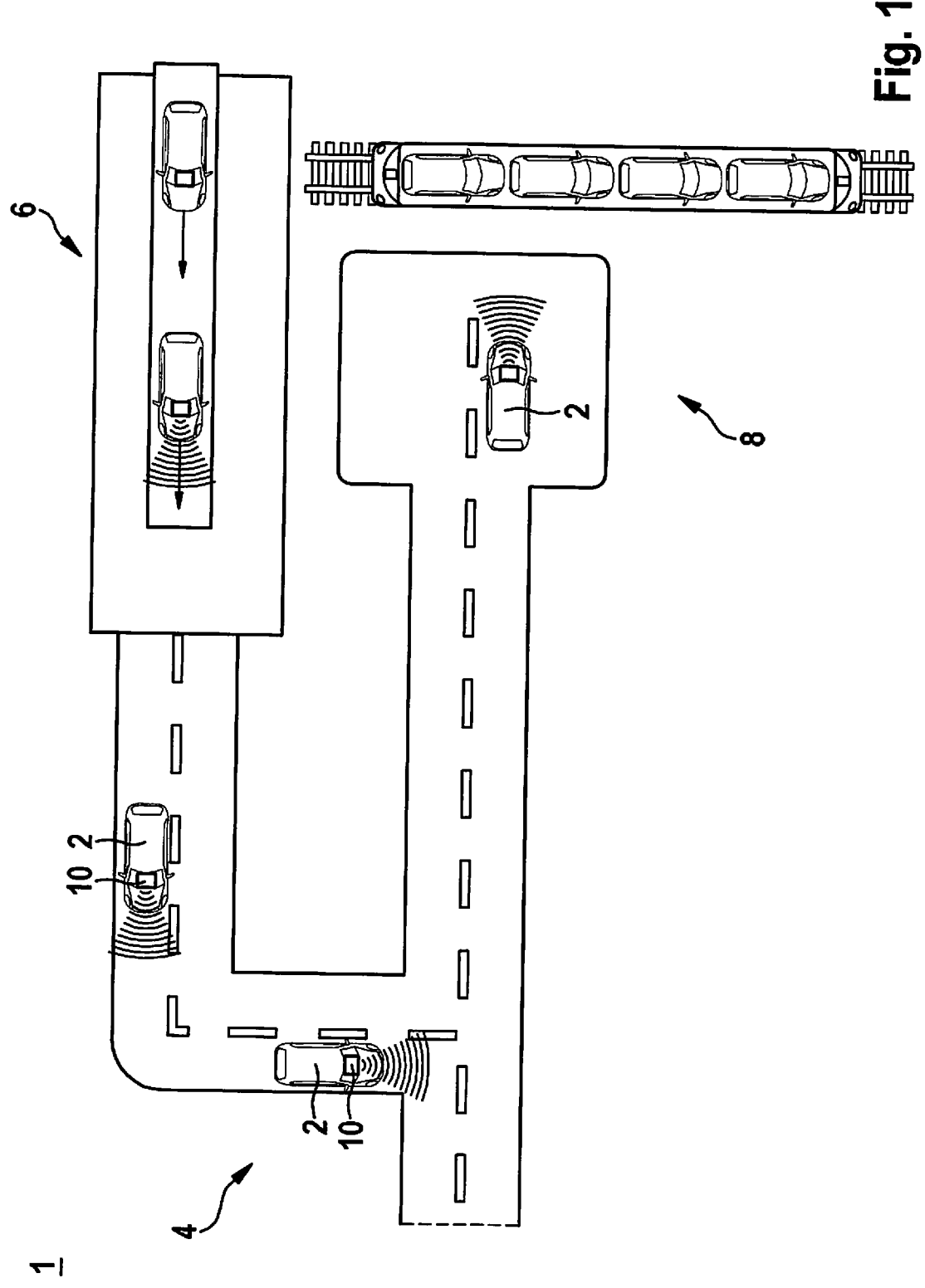
FIG. 1 shows a system according to one specific embodiment of the present invention.

The same structural elements in the figures each have the same reference numerals.

FIG. 1 shows a system 1 for determining the position of a vehicle 2 on a site 4 and for calculating a trajectory according to one specific embodiment of the present invention.

According to the exemplary embodiment, site 4 is designed in the form of factory grounds. A so-called end-of-line is positioned in a factory work floor 6, at which vehicles 2 undergo final assembly and are subsequently driven in an automated manner to a transfer point 8, where they are then loaded.

Vehicles 2 are equipped with auxiliary devices 10 at end-of-line 6. For this purpose, auxiliary devices 10 are mounted, for example, on a vehicle roof and electronically coupled via connection cables to respective vehicle 2. Auxiliary device 10 is depicted in greater detail in FIG. 2.

Each vehicle 2 includes an auxiliary device 10, with which vehicle 2 is steered in an automated manner within site 4 to transfer point 8 even without an on-board sensor system. Once loaded, auxiliary device 10 may remain on vehicle 2 or may be removed in one step.

Figure 2:
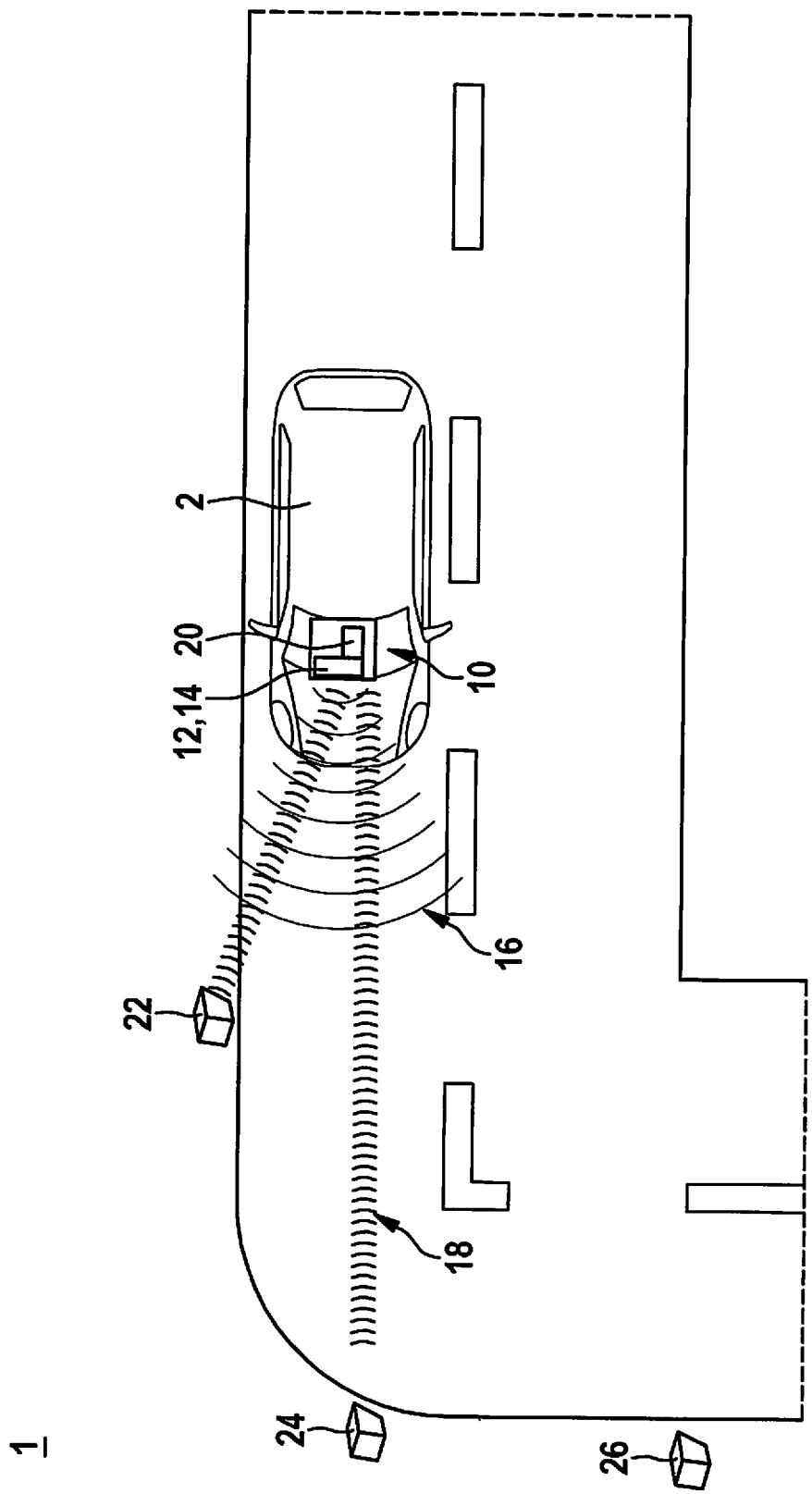
FIG. 2 shows a detail view of the system from FIG. 1.

A detail view of system 1 from FIG. 1 is depicted in FIG. 2. Auxiliary device 10 includes a transmitting unit 12 and a receiving unit 14. Transmitting unit 12 is used to generate and emit electromagnetic beams 16. Electromagnetic beams 18 reflected on an object are subsequently detected by receiving unit 14. Electromagnetic beams 16, 18 according to the exemplary embodiment are radar beams.

Auxiliary device 10 further includes a control unit 20 for activating transmitting unit 12 and for evaluating measuring data of receiving unit 14. Control unit 20 is used, in particular, for calculating a relative and/or an absolute position of auxiliary device 10 and, thus, of vehicle 2.

System 1 includes a multitude of reflector elements 22, 24, 26. Three reflector elements 22, 24, 26 are depicted for the sake of simplicity. Reflector elements 22, 24, 26 in this case are designed as angle reflectors, which reflect incident beams 16 at an identical angle back to auxiliary device 10. Reflector elements 22, 24, 26 are positioned along a trajectory to be driven by vehicle 2 and are used as position markers or reference points for sensor system 14 of auxiliary device 10. Control unit 20 is able to steer and control vehicle 2 based on the ascertained relative positions of reflector elements 22, 24, 26. A course correction, in particular, may be made by control unit 20 based on the position of reflector elements 22, 24, 26.

Figure 3:
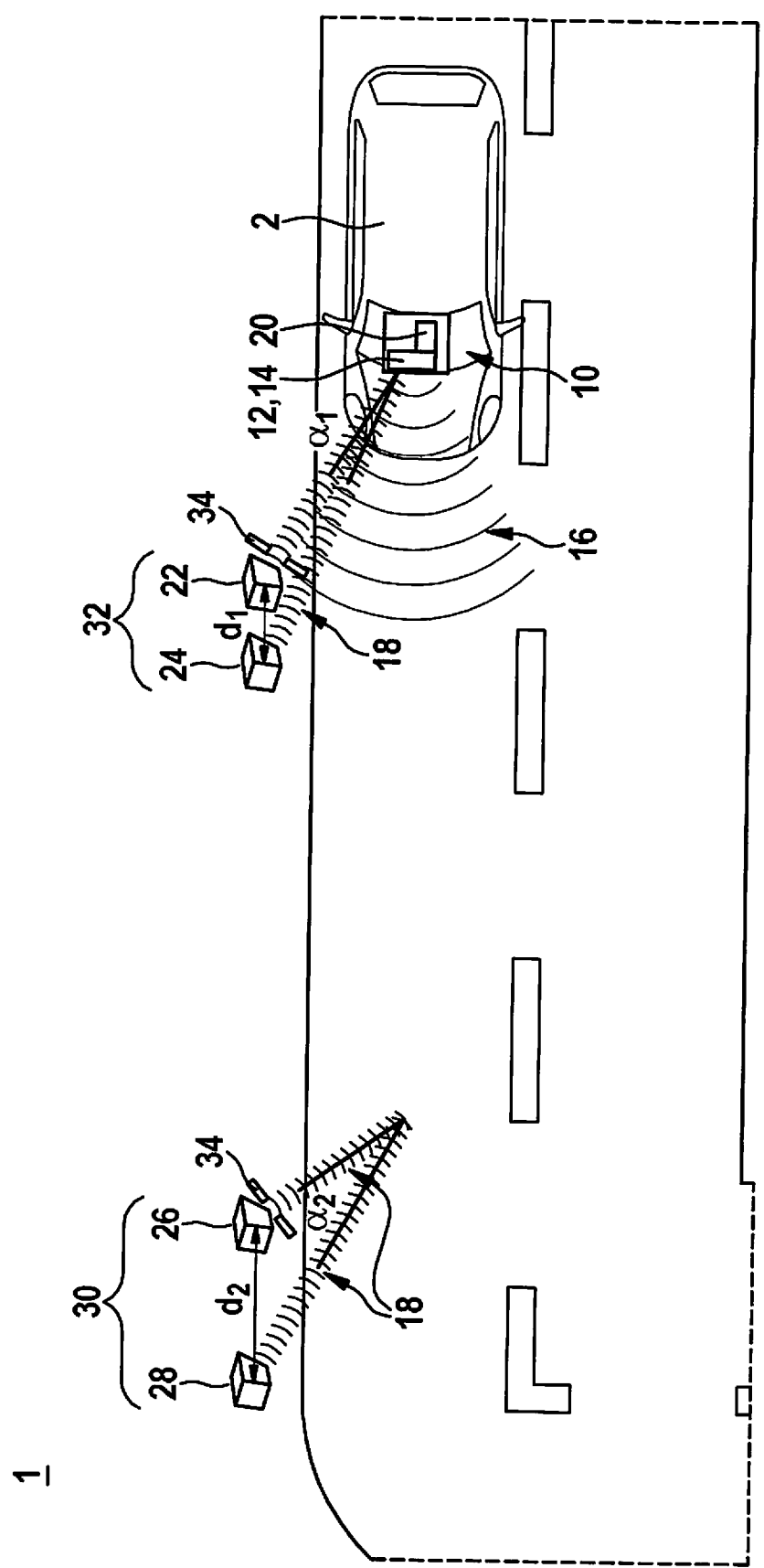
FIG. 3 shows a detail view of a system according to another specific embodiment of the present invention.

FIG. 3 shows a detail view of a system 1 according to another specific embodiment of the present invention. Unlike the exemplary embodiment shown in FIG. 2, system 1 in this case includes reflector elements 22, 24, 26, 28, which are situated at predefined distances d1, d2 to one another.

Control unit 20 of auxiliary device 10 is able, based on the back reflection of reflector elements 22, 24, 26, 28, to determine the position of reflector elements 22, 24, 26, 28 relative to one another and to compare a route section stored in the system and the possible pattern options contained therein. Each pattern in this case is distinct, so that upon recognition of the pattern and by comparison, the system is able to determine a distinct absolute position of vehicle 2. The patterns or distances d1, d2 of reflector elements 22, 24, 26, 28 may be stored, for example, in control unit 20.

In addition, an angle $\alpha1$, $\alpha2$ may be ascertained by auxiliary device 10 between reflected beams 18 of reflector elements 22, 24, 26, 28 of a group 30, 32 or of a control point 30, 32. To prevent ambiguities in the evaluation of the detected beams by receiving unit 14, reflector elements 22, 24, 26, 28 combined in groups 30, 32 include shields 34.

As a result of shields 34, reflector elements 22, 24, 26, 28 may be detected only within a defined area by sensor system 12, 14 of auxiliary device 10. Electromagnetic beams 18 reflected by reflector elements 22, 24, 26, 28 are shown by way of example to illustrate the effects of shield 34.

What is claimed is:

1. A system for determining a position of a vehicle on a site and for calculating a trajectory, comprising:
    at least one vehicle;
    at least one auxiliary device including a control unit; and
    a plurality of reflector elements mounted in surroundings of the vehicle along a designated driving route section, reflector elements of each of a plurality of pairs of the reflector elements being separated from one another by a respective predefined distance from one another along the designated driving route section, the respective predefined distances being distances along a trajectory to be driven by the vehicle, being distinct relative to one another, and being stored in the control unit;
    wherein the auxiliary device transmits and receives electromagnetic beams;
    wherein the auxiliary device includes a control unit configured to: (i) ascertain a distance along the trajectory between at least two of the reflector elements based on reflections of the electromagnetic beams by the at least two of the reflector elements, (ii) compare the ascertained distance to the respective predefined distances stored in the control unit, (iii) determine the position of the vehicle along the designated driving route section based on the comparison.

2. The system as recited in claim 1, wherein the control unit is configured to determine angles of incidence of the received electromagnetic beams.

3. The system as recited in claim 1, wherein at least one of the reflector elements includes a shield.

4. The system as recited in claim 3, wherein the shield is designed differently at each position in the surroundings of the vehicle or is attached at a different angle to the at least one reflector element.

5. The system as recited in claim 1, wherein the auxiliary device at least one of ascertains and uses odometry data for determining the position of the vehicle on the site.

6. A method for navigating at least one vehicle along a trajectory and for determining a position of the vehicle on a site using an auxiliary device situated on the vehicle, comprising:
    ascertaining a relative position of the vehicle or an absolute position of the vehicle, as a result of an interaction of the auxiliary device with at least two reflector elements of a plurality of reflector elements, the plurality of reflector elements being situated along a designated driving route section at the site, reflector elements of each of a plurality of pairs of the reflector elements being separated from one another by a respective predefined distance from one another along the designated driving route section, the respective predefined distances being distances along a trajectory to be driven by the vehicle, being distinct relative to one another, and being stored in a control unit of the auxiliary device; and
    steering the vehicle based on the ascertained relative position or absolute position;
    wherein the ascertaining includes: (i) ascertaining a distance along the trajectory between the at least two of the reflector elements based on reflections of electromagnetic beams by the at least two of the reflector elements, (ii) comparing the ascertained distance to the respective predefined distances stored in the control unit, (iii) determining a position of the vehicle along the designated driving route section based on the comparison.

7. A system for determining a position of a vehicle on a site and for calculating a trajectory, comprising:
    at least one vehicle;
    at least one auxiliary device; and
    a plurality of reflector elements mounted in surroundings of the vehicle along a designated driving route section, the reflector elements being situated at a respective distance from one another along the designated driving route section, the respective distance being distances along a trajectory to be driven by the vehicle, wherein the auxiliary device transmits electromagnetic beams, and receives the electromagnetic beams reflected by the reflector elements;

wherein the at least one auxiliary device includes a control unit configured to determine angles between the reflected electromagnetic beams, and to determine the position of the vehicle on the designated driving route section using the determined angles; and wherein at least one reflector element of the reflector elements includes a shield which is configured so that, due to the shield, the at least one reflector element is detectable by the auxiliary device only at a predefined angle.

8. The system as recited in claim 7, wherein each respective reflector of multiple reflector elements of the reflector elements, situated at different positions in the surroundings of the vehicle, includes a respective shield, wherein, at each of the positions, each of the respective shields is configured differently or is attached at a different angle to the respective reflector, so that, due to the respective shield, each of the respective reflectors is detectable by the auxiliary device only at a first predefined angle.

* * * * *